US008635591B2

(12) United States Patent
Brown et al.

(10) Patent No.: US 8,635,591 B2
(45) Date of Patent: Jan. 21, 2014

(54) EMBEDDING SOFTWARE DEVELOPER COMMENTS IN SOURCE CODE OF COMPUTER PROGRAMS

(75) Inventors: Douglas S. Brown, Charlotte, NC (US); John F. Kelley, Clarkesville, GA (US); Thomas E. Polk, Huntersville, NC (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 12/338,627

(22) Filed: Dec. 18, 2008

(65) Prior Publication Data

US 2010/0162209 A1 Jun. 24, 2010

(51) Int. Cl.
G06F 9/44 (2006.01)
G06F 17/00 (2006.01)
G06F 3/048 (2013.01)

(52) U.S. Cl.
USPC ............ 717/110; 717/123; 707/607; 715/810

(58) Field of Classification Search
USPC .......................................................... 717/110
See application file for complete search history.

(56) References Cited

U.S. PATENT DOCUMENTS

| | | | |
|---|---|---|---|
| 6,340,977 B1 | 1/2002 | Lui et al. | |
| 6,546,405 B2 * | 4/2003 | Gupta et al. | 715/233 |
| 7,020,697 B1 | 3/2006 | Goodman et al. | |
| 7,137,127 B2 | 11/2006 | Slotznick | |
| 7,577,901 B1 * | 8/2009 | Hull et al. | 715/230 |
| 2004/0088679 A1 * | 5/2004 | Grala | 717/110 |
| 2004/0189713 A1 * | 9/2004 | Thames et al. | 345/810 |
| 2005/0066280 A1 * | 3/2005 | Austin et al. | 715/733 |
| 2005/0071776 A1 * | 3/2005 | Mansfield et al. | 715/805 |
| 2007/0168944 A1 * | 7/2007 | Pratt | 717/110 |
| 2007/0226681 A1 * | 9/2007 | Thorup | 717/104 |
| 2007/0240060 A1 * | 10/2007 | Berenbach et al. | 715/723 |
| 2007/0250810 A1 * | 10/2007 | Tittizer et al. | 717/110 |
| 2008/0021922 A1 * | 1/2008 | Hailpern et al. | 707/103 R |
| 2008/0184198 A1 * | 7/2008 | Sabella et al. | 717/110 |
| 2009/0193398 A1 * | 7/2009 | Mitchell | 717/137 |

OTHER PUBLICATIONS

Aubert; Advene: An Open-Source Framework for Integrating and Visualizing Audiovisual Metadata; Sep. 2007; pp. 1005-1008; Augsburg, Bavaria, Germany.

Wijayaratne; System Support for Providing Integrated Services From Networked Multimedia Storage Servers; 2001; pp. 270-279; Ottawa, Canada.

Yang; Streaming Support for Java RMI in Distributed Environments; 2006; pp. 53-61; Manheim, Germany.

* cited by examiner

*Primary Examiner* — Don Wong
*Assistant Examiner* — Mohammad Kabir
(74) *Attorney, Agent, or Firm* — H. Barrett Spraggins; John R. Pivnichny; Biggers Kennedy Lenart Spraggins LLP

(57) ABSTRACT

Computer-implemented methods, apparatus, and products for embedding software developer comments in source code of computer programs that includes receiving, by a software development application from a software developer, a location in source code of a computer program at which to insert a multimedia annotation, the multimedia annotation including software developer comments; and inserting, at the location in the source code, by the software development application, a hyperlink including a URL specifying a storage location for the multimedia annotation.

11 Claims, 5 Drawing Sheets

EMBEDDING SOFTWARE DEVELOPER COMMENTS IN SOURCE CODE OF COMPUTER PROGRAMS

BACKGROUND OF THE INVENTION

1. Field of the Invention

The field of the invention is data processing, or, more specifically, methods, apparatus, and products for embedding software developer comments in source code of computer programs.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today are capable of executing a larger number and more complex computer program instructions in a computer program. Computer programs today may include many thousands or hundreds of thousands of lines of source code. From time to time, developers insert comments in such source code describing the code, its functionality, its unique properties, and so on, so that other software developers reviewing the code more fully understand the code. Current developer comments in source code, however, include only textual comments. Textual comments have some drawbacks. In many cases, for example, such comments are kept short in length to reduce clutter in the source code. Such terse comments may inadequately describe the source code. Further, even when the textual comments are of a greater length, text is generally less explanatory than figures, drawings, images, videos, audio, screen casts—recorded videos of user interactions with GUI software, or other multimedia based content.

SUMMARY OF THE INVENTION

Disclosed in this specification are computer-implemented methods, apparatus, and products for embedding software developer comments in source code of computer programs that includes receiving, by a software development application from a software developer, a location in source code of a computer program at which to insert a multimedia annotation, the multimedia annotation including software developer comments; and inserting, at the location in the source code, by the software development application, a hyperlink including a Uniform Resource Locator ('URL') specifying a storage location for the multimedia annotation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
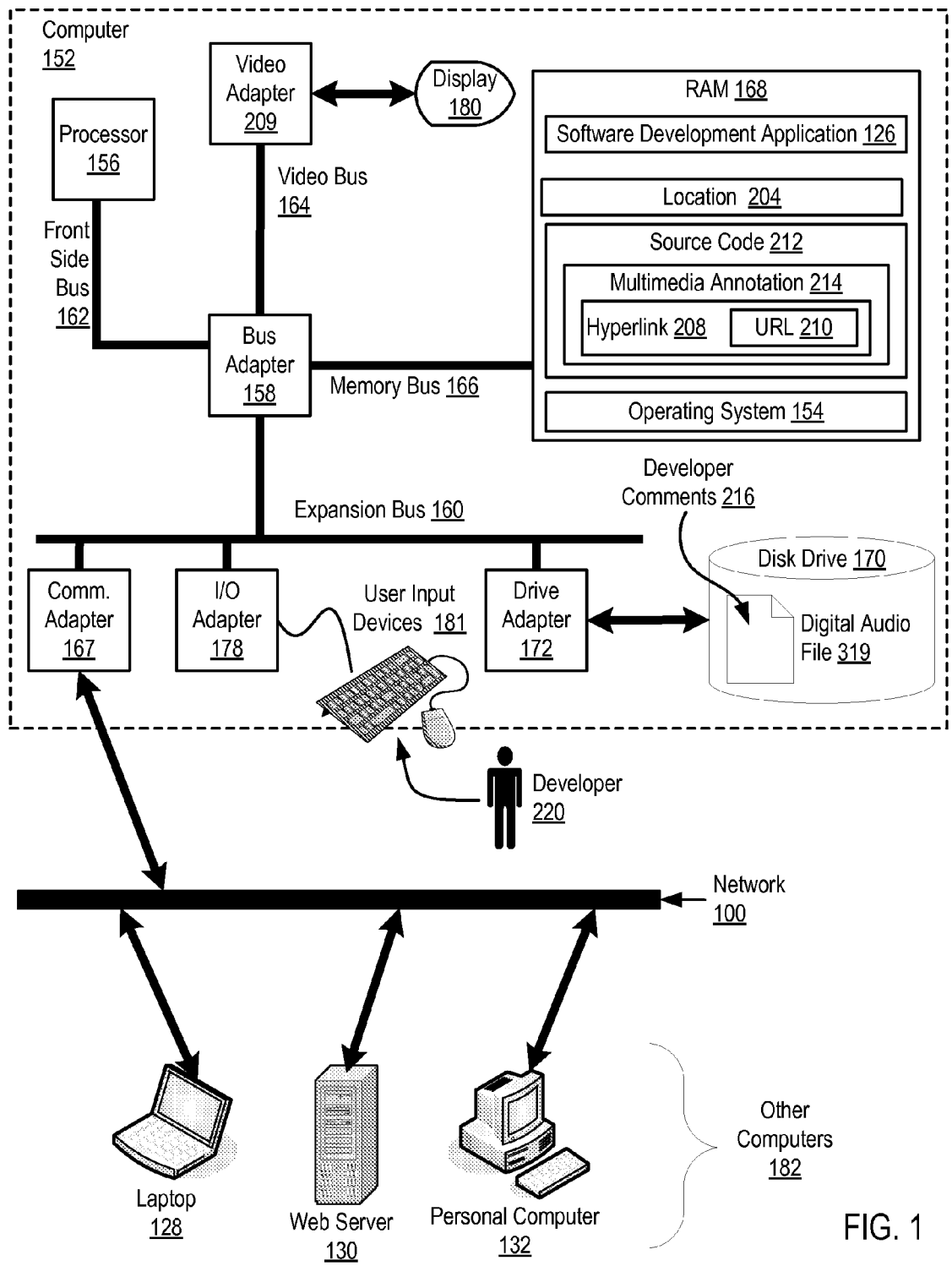
FIG. 1 sets forth a network diagram of an exemplary system for embedding software developer comments in source code of computer programs according to embodiments of the present invention.

Exemplary methods, apparatus, and products for embedding software developer comments in source code of computer programs in accordance with the present invention are described with reference to the accompanying drawings, beginning with FIG. 1. FIG. 1 sets forth a network diagram of an exemplary system for embedding software developer comments in source code of computer programs according to embodiments of the present invention. The system of FIG. 1 includes a computer (152) which in turn includes at least one computer processor (156) or 'CPU' as well as random access memory (168) ('RAM') which is connected through a high speed memory bus (166) and bus adapter (158) to processor (156) and to other components of the computer (152).

Stored in RAM (168) of the computer (152) is a software development application (126), a module of computer program instructions capable of embedding software developer comments in source code of computer programs according to embodiments of the present invention by receiving from a software developer (220) a location (204) in source code (212) of a computer program at which to insert a multimedia annotation (214) and inserting, at the location (204) in the source code (212), a hyperlink (208) including a Uniform Resource Locator ('URL') (210) specifying a storage location for the multimedia annotation. The term 'multimedia annotation' as used in this specification my refer to one or more of: a hyperlink in source code that does not directly contain developer comments, but is, in effect, a representation in the source code of developer comments; or a file stored in computer memory that actually contains a developer's recorded comments. The contents of the multimedia annotation 'annotate', that is, describe one or more portions of source code, typically a portion of the code located in proximity to the hyperlink (208) in the source code (212). Unlike the developer comments of the prior art which are typically short textual comments, developers comments according to embodiments of the present invention are implemented with various types of multimedia, including for example, audio, video, digital images, slideshows, screen captures, screen casts, and the like. Examples of digital audio file formats include MP3, WAV, WMA, and so on. Examples of digital video file formats include MOV, MP4, WMV, and so on. Examples of digital file formats for slideshow include Microsoft's Powerpoint™ file format, Apple's Keynote™ file format, and the like.

Consider, for example, that the developer (220) records verbal comments in a digital audio file (319) using a microphone connected to the I/O adapter (167) of FIG. 1 and audio recording software which stores the digital audio file (319) in disk drive (170). The developer may then provide to the software development application (126) a location in source code to insert the audio comments and a file path identifying a directory in the file system of the computer (152) at which the digital audio file. The software development application (126) according to embodiments of the present invention then may form a URL using the provided file path and insert a hyperlink including the URL at the developer provided location in source code (212). When another user views the source code, the user may invoke URL through a mouse click on the hyperlink, thereby accessing the digital audio file stored in the disk drive (170) and receiving the developer's (220) comments (216).

Also stored in RAM (168) is an operating system (154). Operating systems useful for embedding software developer comments in source code of computer programs according to embodiments of the present invention include UNIX™, Linux™, Microsoft XP™, AIX™, IBM's i5/OS™, and others as will occur to those of skill in the art. The operating system (154), Software development application (126), source code (212), and so on in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that embed software developer comments in source code of computer programs according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182), such as the personal computer (132), web server (130), and laptop (128) of FIG. 1, and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embedding software developer comments in source code of computer programs according to embodiments of the present invention include modems for wired dial-up communications, Ethernet (IEEE 802.3) adapters for wired data communications network communications, and 802.11 adapters for wireless data communications network communications.

The arrangement of software developer (220), network (100), computers (152, 182), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
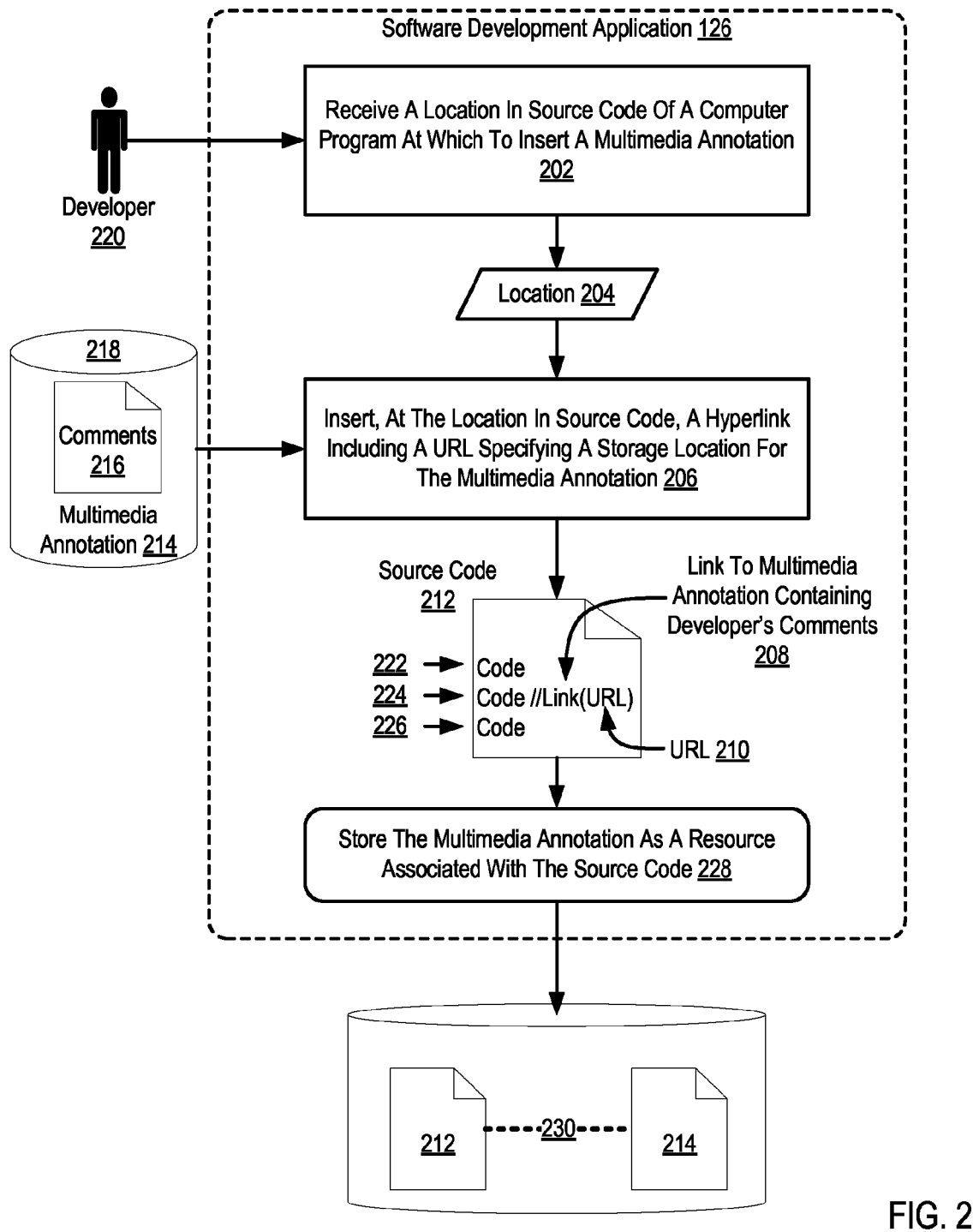
FIG. 2 sets forth a flow chart illustrating an exemplary method for embedding software developer comments in source code of computer programs according to embodiments of the present invention.

For further explanation, FIG. 2 sets forth a flow chart illustrating an exemplary method for embedding software developer comments in source code of computer programs according to embodiments of the present invention. The method of FIG. 2 may be carried out by computer similar to the depicted and described in FIG. 1. The method of FIG. 2 includes receiving (202), by a software development application (126) from a software developer (220), a location (204) in source code (212) of a computer program at which to insert a multimedia annotation (214). In the method of FIG. 2, the multimedia annotation (214) includes software developer comments (216). Receiving (202), by a software development application (126) from a software developer (220), a location (204) in source code (212) of a computer program at which to insert a multimedia annotation (214) may be carried out in various ways including, for example, by receiving one or more I/O device inputs including a secondary-mouse click that invokes a GUI drop down menu and a primary-mouse click that selects an item from the GUI drop down menu representing an option for a user to insert a multimedia annotation, where the location of a mouse pointer or cursor when the secondary-mouse click was received is the location at which to insert the multimedia annotation. Readers of skill in the art will immediately recognize that a primary-mouse click, as the term is used here, refers to a typical left mouse click and a secondary-mouse click refers to a typical right mouse click. In this example, by right clicking the mouse, the software developer is presented with a drop down menu with at least one option including "Insert Multimedia Annotation" or the like, which when selected provides to the software development application the location in source at which to insert the multimedia annotation, the location of the cursor or mouse pointer when the software developer right clicked the mouse.

The method of FIG. 2 also includes inserting (206), at the location (204) in the source code (212), by the software development application (126), a hyperlink (208) including a Uniform Resource Locator ('URL') (210) specifying a storage location (218) for the multimedia annotation (214). Inserting (206), at the location (204) in the source code (212), by the software development application (126), a hyperlink (208) may be carried out by forming the URL and hyperlink using the storage location in computer memory (218) of the digital multimedia file that includes recorded developer comments (214), and inserting, after a predefined set of characters representing to the software developer, software development application, and a compiler, a multimedia annotation, the hyperlink. The storage location of the digital multimedia file may be provided to the software development application in a number of ways described below with respect to FIG. 4 and FIG. 5. In the method of FIG. 2, the example source code (212) includes three lines (222, 224, 226) of code and the software development application (126) has inserted in one line (224) of the source code (212) a multimedia annotation in the form of a hyperlink (208) containing a URL (210) that specifies the storage location in computer memory (218) of a digital multimedia file containing recorded software developer (220) comments (214).

The method of FIG. 2 also includes an optional step: storing (228), by the software development application (126), the multimedia annotation (214) as a resource associated (230) with the source code (212). That is, in some embodiments of the present invention the software development application may store the digital multimedia file that includes the recorded developer's comments along with the source code in a manner similar to storing other resources, libraries of code, configuration files, and so on. Storing (228) the multimedia annotation (214) as a resource associated (230) with the source code (212) may be carried out in various ways including, for example, by storing the multimedia annotation, the digital multimedia file, and the source code in the same directory of a file system.

Figure 3:
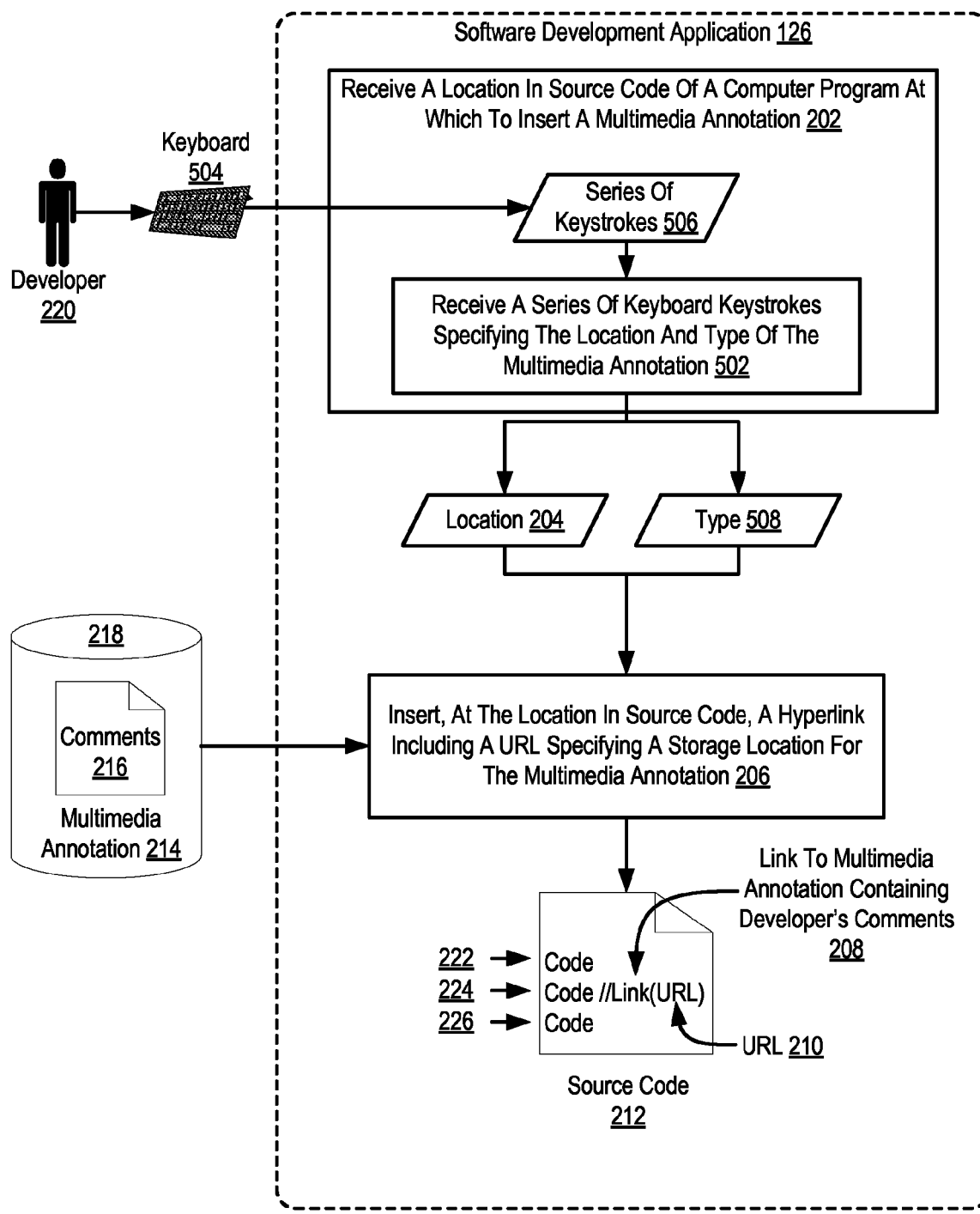
FIG. 3 sets forth a flow chart illustrating a further exemplary method for embedding software developer comments in source code of computer programs according to embodiments of the present invention.

For further explanation, FIG. 3 sets forth a flow chart illustrating a further exemplary method for embedding software developer comments in source code of computer programs according to embodiments of the present invention. The method of FIG. 3 is similar to the method of FIG. 2 including as it does receiving (202) from a software developer (220) a location (204) in source code (212) of a computer program at which to insert a multimedia annotation (214) and inserting (206), at the location (204) in the source code (212), a hyperlink (208) including a URL (210) specifying a storage location (218) for the multimedia annotation (214).

As mentioned above with respect to FIG. 2, receiving (202) the location (204) in the source code (212) at which to insert the multimedia annotation (214) may be carried out in various ways. The method of FIG. 3 differs from the method of FIG. 2, therefore, in that in the method of FIG. 3, receiving (202) a location (204) in source code (212) of a computer program at which to insert a multimedia annotation (214) is carried out by receiving (502) a series (506) of keyboard (504) keystrokes indicating the location in source code (212) at which to insert the multimedia annotation (214) and a type (508) of the multimedia annotation. The 'type' of multimedia annotation refers to the type of digital file that includes the recorded developer comments, such as, for example audio, video, screencast, image, slideshow, and so on.

Receiving (502) a series (506) of keyboard (504) keystrokes indicating the location in source code (212) may be carried out through an I/O adapter (178 on FIG. 1) of a computer (152 on FIG. 1) by receiving a predefined series of ASCII (American Standard Code for Information Interchange) characters from a keyboard (504) connected to the I/O adapter, the location of a cursor after the last character is typed indicates the location at which to insert the multimedia annotation. In prior art, text comments in some source code are designated with a series of keyboard keystrokes such as for example '//.' Consider the following series of ASCII characters as an example of a predefined series of characters indicating a multimedia annotation and type: //mma:audio. Where the '//' characters indicate to the software development application, the insertion of developer's comments, 'mma' specifies the comments to be a multimedia annotation instead of text, and 'audio' indicates that the type of multimedia annotation is recorded audio. When the series (506) of keyboard (504) keystrokes is entered, the software development application (126) receives the location (204) at which to insert the multimedia annotation (214) such as, for example, the location in the source code after the last character of the series. That is, a hyperlink (208) including a URL (210) specifying the storage location of the multimedia annotation may be inserted in source code (212) by the software development application (126) after the series of characters entered by the series of keyboard keystrokes. When compiling the source code for execution on a processor where the source code includes characters indicating a multimedia annotation, the compiler is configured to ignore the annotation for compiling.

Figure 4:
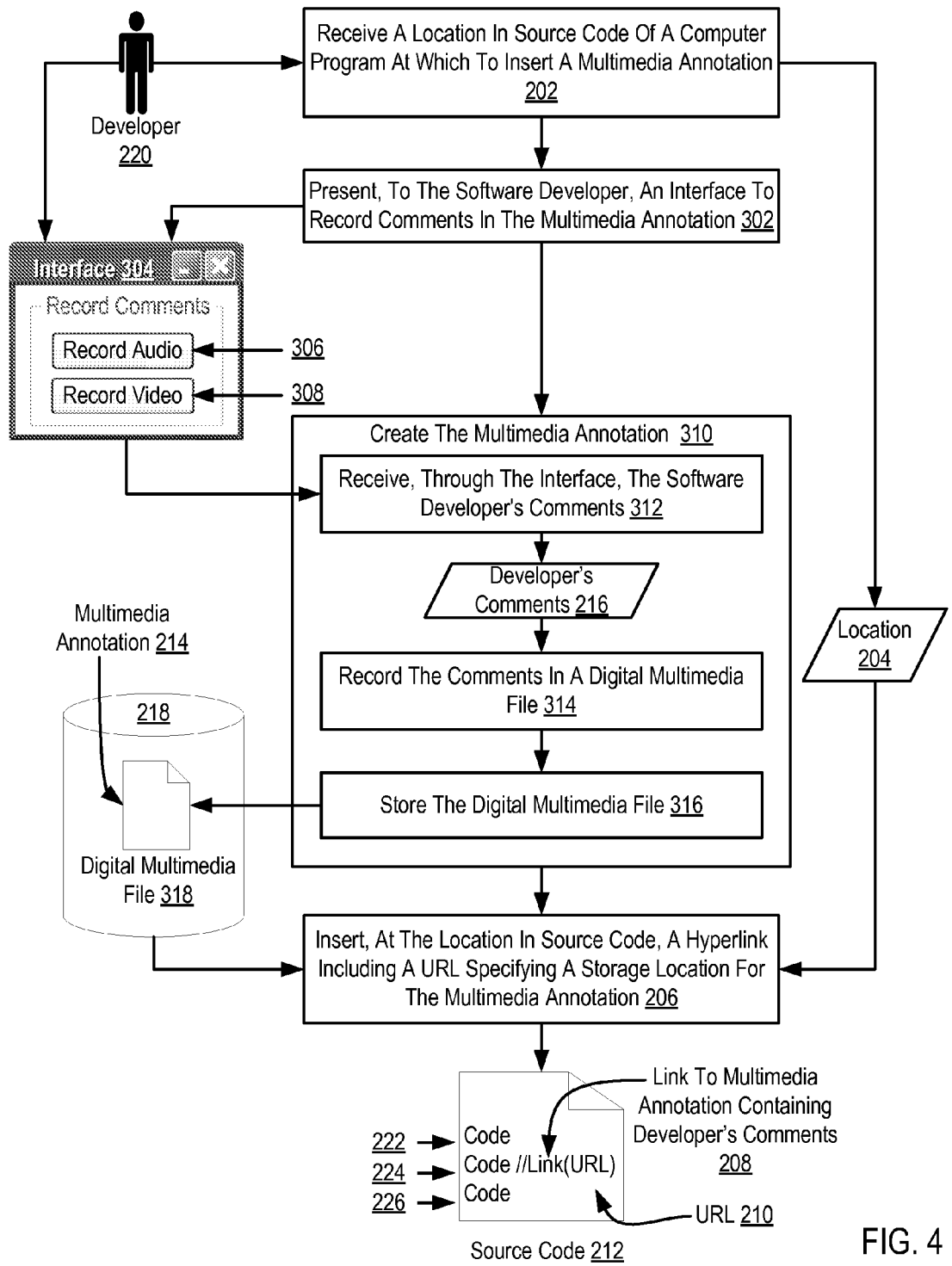
FIG. 4 sets for a flow chart illustrating a further exemplary method for embedding software developer comments in source code of computer programs according to embodiments of the present invention.
Figure 5:
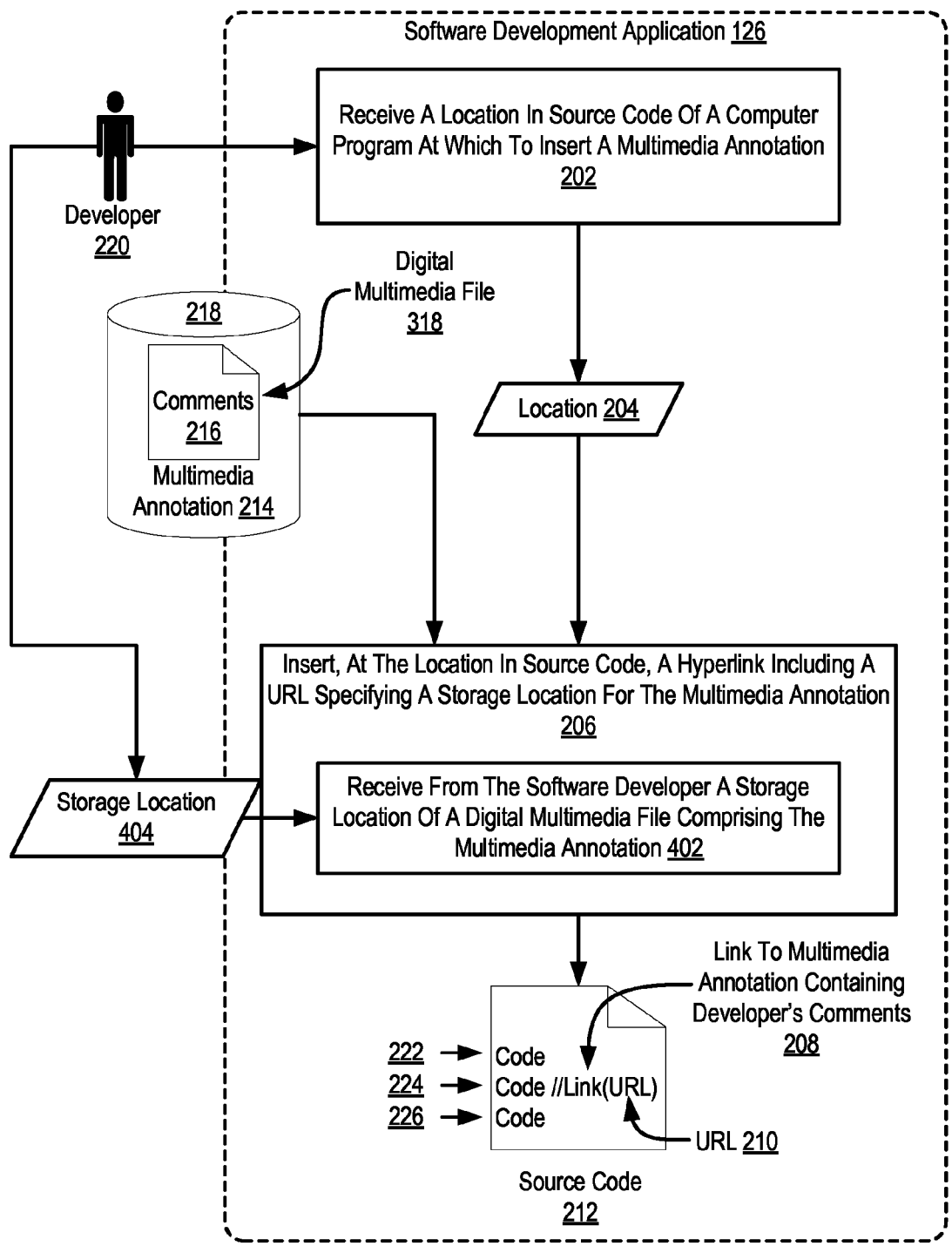
FIG. 5 sets for a flow chart illustrating a further exemplary method for embedding software developer comments in source code of computer programs according to embodiments of the present invention.

Another example implementation of a series (506) of keyboard keystrokes which may specify a location in source code at which to insert a multimedia in accordance with embodiments of the present invention is a so-called keyboard shortcut, a predefined combination of one or more keystrokes that when entered by a software developer (220) through a keyboard (504) indicates to the software developer application that the current location of a cursor in source code is the location at which to insert a multimedia annotation (214). Consider as an example of such a keyboard shortcut, the near-simultaneous combination of keystrokes representing the keys Control, Shift, the letter I, and the letter V, where the letter I represents a command to 'insert' a multimedia annotation, and the letter 'V' represents a type of a multimedia application to insert, namely a video. Readers of skill in the art will recognize that such example keyboard keystrokes are among many possible implementations of series of keyboard keystrokes that when received by a software development application (126) configured for embedding software developer comments according to embodiments of the present invention specifies a location and type of the multimedia application. For further explanation, FIG. 4 and FIG. 5 depict two alternative ways that a software development application configured for embedding develop comments in source code according to embodiments of the present invention obtains the storage location in computer memory of the multimedia annotation (214), that is, the storage location in computer memory of a digital multimedia file that includes recorded software developer comments. The software development application uses the storage location to form the representation in the source code of the multimedia annotation, that is, the URL and hyperlink inserted into the source code. The methods of FIG. 4 and FIG. 5 are similar to the method of FIG. 2 in that the methods of FIG. 4 and FIG. 5 include receiving (202) from a software developer (220) a location (204) in source code (212) of a computer program at which to insert a multimedia annotation (214) and inserting (206), at the location (204) in the source code (212), a hyperlink (208) including a URL (210) specifying a storage location (218) for the multimedia annotation (214).

More specifically, the method of FIG. 4 sets for a flow chart illustrating a further exemplary method for embedding software developer comments in source code of computer programs according to embodiments of the present invention in which the software development application creates and stores in computer memory the digital multimedia file that includes recorded developer comments, that is, the multimedia annotation, thereby possessing the storage location with which to form the URL of the hyperlink in the source code.

Responsive to receiving (202) the location (204) in the source code (212) at which to insert the multimedia annotation (214), the method of FIG. 4 includes presenting (302), by the software development application (126 on FIG. 2) to the software developer (220), an interface (304) to record the developer's comments in the multimedia annotation (214). Presenting (302), by the software development application (126 on FIG. 2) to the software developer (220), an interface (304) to record the developer's comments in the multimedia annotation (214) may be carried out by presenting a Graphical User Interface ('GUI') dialog box that with GUI button for options to record audio (306), record video (308), perform a screen capture, capture a digital image with a digital camera connection to the computer on which the software development application is running, record a screen cast, and so on as will occur to readers of skill in the art.

The method of FIG. 4 also includes creating (310), by the software development application, the multimedia annotation (214). In the method of FIG. 4, creating (310), by the software development application, the multimedia annotation (214) is carried out by receiving (312), through the interface (304), the software developer's comments (216), recording (314) the comments (216) in a digital multimedia file (318), and storing (316) the digital multimedia file (318). The software development application (126 on FIG. 2) upon storing the digital multimedia file (318) in computer memory (218) is in possession of the storage location, a file path in a file system for example, with which to form the URL (210) of the hyperlink (208) in the source code (212).

The method of FIG. 5, in contrast to the method of FIG. 4, sets for a flow chart illustrating a further exemplary method for embedding software developer comments in source code of computer programs according to embodiments of the present invention in which the software development application receives the storage location in computer memory of the digital multimedia file that includes recorded developer comments, that is, the multimedia annotation, directly from the software developer, thereby possessing the storage location with which to form the URL of the hyperlink in the source code.

In the method of FIG. 5, inserting (206), at the location (204) in source code (212) a hyperlink (208) including a URL (210) specifying the multimedia annotation's (214) storage location includes receiving (402) from the software developer (220) a storage location (404) of a digital multimedia file (318), that is, the storage location in computer memory (218) of the multimedia annotation (214). The example software developer (220) of FIG. 5 may record comments in a digital multimedia file (318), the multimedia annotation, prior to providing the storage location in computer memory (218) to the software development application and even prior to providing the location in source code at which to insert the multimedia annotation. Receiving (402) from the software developer (220) a storage location (404) of a digital multimedia file (318) may include prompting the developer for the storage location and receiving a file path of a file system indicating the location in a directory of a file system of the digital multimedia file (318), the multimedia annotation (214).

Exemplary embodiments of the present invention are described largely in the context of a fully functional computer system for embedding software developer comments in source code of computer programs. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of embedding software developer comments in source code of computer programs, the method comprising:

receiving, by a software development application from a software developer, a location in source code of a computer program at which to insert a multimedia annotation, the multimedia annotation comprising software developer comments;

inserting, at the location in the source code, by the software development application, a hyperlink including a Uniform Resource Locator ('URL') specifying a storage location for the multimedia annotation, wherein the multimedia annotation comprises one of a digital audio file, a digital video file, or a digital image file; and storing, by the software development application, the multimedia annotation as a resource associated with the source code, including storing the multimedia annotation and the source code in the same directory of a file system.

2. The method of claim 1 further comprising:

responsive to receiving the location in the source code at which to insert the multimedia annotation, presenting, by the software development application to the software developer, an interface to record the developer's comments in the multimedia annotation;

creating, by the software development application, the multimedia annotation including:

receiving, through the interface, the software developer's comments;

recording the comments in a digital multimedia file; and storing the digital multimedia file.

3. The method of claim 1 wherein inserting at the location in the source code a hyperlink including a URL specifying the multimedia annotation's storage location further comprises:

receiving from the software developer a storage location of a digital multimedia file comprising the multimedia annotation.

4. The method of claim 1 wherein receiving a location in source code of a computer program at which to insert a multimedia annotation further comprises:
    receiving a series of keyboard keystrokes indicating the location in the source code at which to insert the multimedia annotation and a type of the multimedia annotation.

5. An apparatus for embedding software developer comments in source code of computer programs, the apparatus comprising a computer processor, a computer memory operatively coupled to the computer processor, the computer memory having disposed within it computer program instructions capable of:
    receiving, by a software development application from a software developer, a location in source code of a computer program at which to insert a multimedia annotation, the multimedia annotation comprising software developer comments;
    inserting, at the location in the source code, by the software development application, a hyperlink including a Uniform Resource Locator ('URL') specifying a storage location for the multimedia annotation wherein the multimedia annotation comprises one of a digital audio file, a digital video file, or a digital image file; and
    storing, by the software development application, the multimedia annotation as a resource associated with the source code, including storing the multimedia annotation and the source code in the same directory of a file system.

6. The apparatus of claim 5 further comprising computer program instructions capable of:
    responsive to receiving the location in the source code at which to insert the multimedia annotation, presenting, by the software development application to the software developer, an interface to record the developer's comments in the multimedia annotation; and
    creating, by the software development application, the multimedia annotation including:
    receiving, through the interface, the software developer's comments;
    recording the comments in a digital multimedia file; and
    storing the digital multimedia file.

7. The apparatus of claim 5 wherein inserting at the location in the source code a hyperlink including a URL specifying the multimedia annotation's storage location further comprises:
    receiving from the software developer a storage location of a digital multimedia file comprising the multimedia annotation.

8. A computer program product for embedding software developer comments in source code of computer programs, the computer program product disposed in a computer readable recordable medium, wherein the computer readable recordable medium is not a signal, the computer program product comprising computer program instructions capable of:
    receiving, by a software development application from a software developer, a location in source code of a computer program at which to insert a multimedia annotation, the multimedia annotation comprising software developer comments; and
    inserting, at the location in the source code, by the software development application, a hyperlink including a Uniform Resource Locator ('URL') specifying a storage location for the multimedia annotation wherein the multimedia annotation comprises one of a digital audio file, a digital video file, or a digital image file; and
    storing, by the software development application, the multimedia annotation as a resource associated with the source code, including storing the multimedia annotation and the source code in the same directory of a file system.

9. The computer program product of claim 8 further comprising computer program instructions capable of:
    responsive to receiving the location in the source code at which to insert the multimedia annotation, presenting, by the software development application to the software developer, an interface to record the developer's comments in the multimedia annotation; and
    creating, by the software development application, the multimedia annotation including:
    receiving, through the interface, the software developer's comments;
    recording the comments in a digital multimedia file; and
    storing the digital multimedia file.

10. The computer program product of claim 8 wherein inserting at the location in the source code a hyperlink including a URL specifying the multimedia annotation's storage location further comprises:
    receiving from the software developer a storage location of a digital multimedia file comprising the multimedia annotation.

11. The computer program product of claim 8 wherein receiving a location in source code of a computer program at which to insert a multimedia annotation further comprises:
    receiving a series of keyboard keystrokes indicating the location in the source code at which to insert the multimedia annotation and a type of the multimedia annotation.

\* \* \* \* \*